United States Patent

[11] 3,557,650

| [72] | Inventor | Armindo Cantarutti<br>Akron, Ohio |
|------|----------|-----------------------------------|
| [21] | Appl. No. | 630,384 |
| [22] | Filed | Apr. 12, 1967 |
| [45] | Patented | Jan. 26, 1971 |
| [73] | Assignee | AMK Subsidiary Corporation<br>Akron, Ohio<br>a corporation of Ohio, by mesne assignment |

[54] TIRE MATERIAL CUTTING APPARATUS
19 Claims, 6 Drawing Figs.

[52] U.S. Cl. .................................................. 83/155,
83/171, 83/563, 83/614, 83/922
[51] Int. Cl. ................................................... B29h 17/30
[50] Field of Search .......................................... 156/405,
510; 83/155, 171, 215, 353, 356, 556, 563, 582,
614, 922; 242/56

[56] References Cited
UNITED STATES PATENTS

| 925,096 | 6/1909 | Hardy | 83/582X |
| 2,665,757 | 1/1954 | Stevens et al. | 156/405X |
| 1,419,064 | 6/1922 | Landon | 156/405 |
| 1,961,725 | 6/1934 | Abbott | 156/405X |
| 3,026,230 | 3/1962 | Nebout | 156/405X |
| 3,142,603 | 7/1964 | Parshall et al. | 156/405 |
| 3,205,743 | 9/1965 | Langenberg et al. | 83/215 |
| 3,213,735 | 10/1965 | Keferstein et al. | 83/353 |
| 3,240,092 | 3/1966 | Zimmerman | 83/353X |
| 3,411,975 | 11/1968 | Rowe | 156/405 |

FOREIGN PATENTS

| 995,132 | 6/1965 | Great Britain | 83/171 |

*Primary Examiner*—Benjamin A. Borchelt
*Assistant Examiner*—Stephen C. Bentley
*Attorney*—Oberlin, Maky, Donnelly and Renner

ABSTRACT: A liner or like cutter for a cut-to-length device for a tire building machine which includes a knife blade movable transversely of the work in a knife housing in response to a work length signal and which cutter can be indexed into and from operative position.

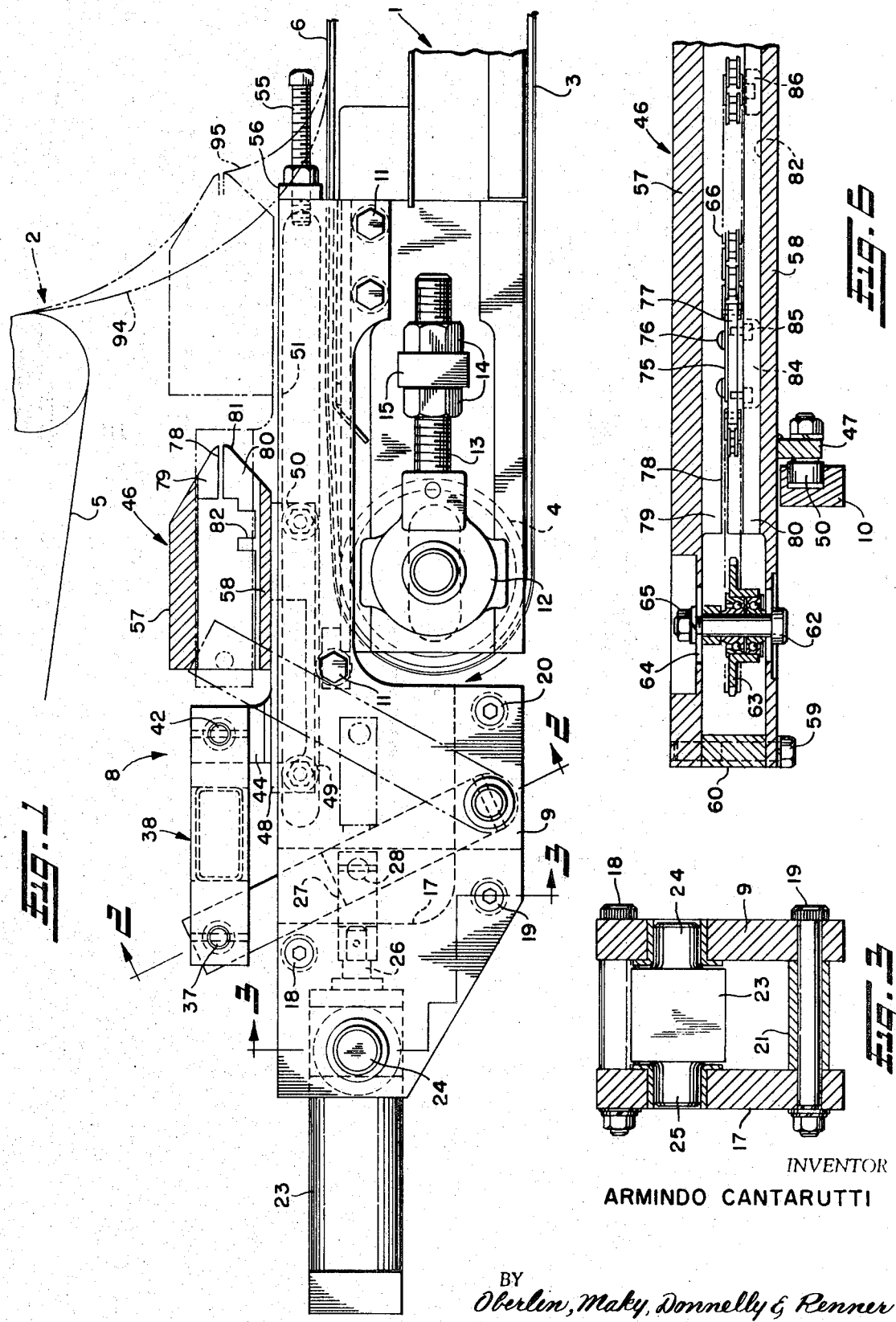

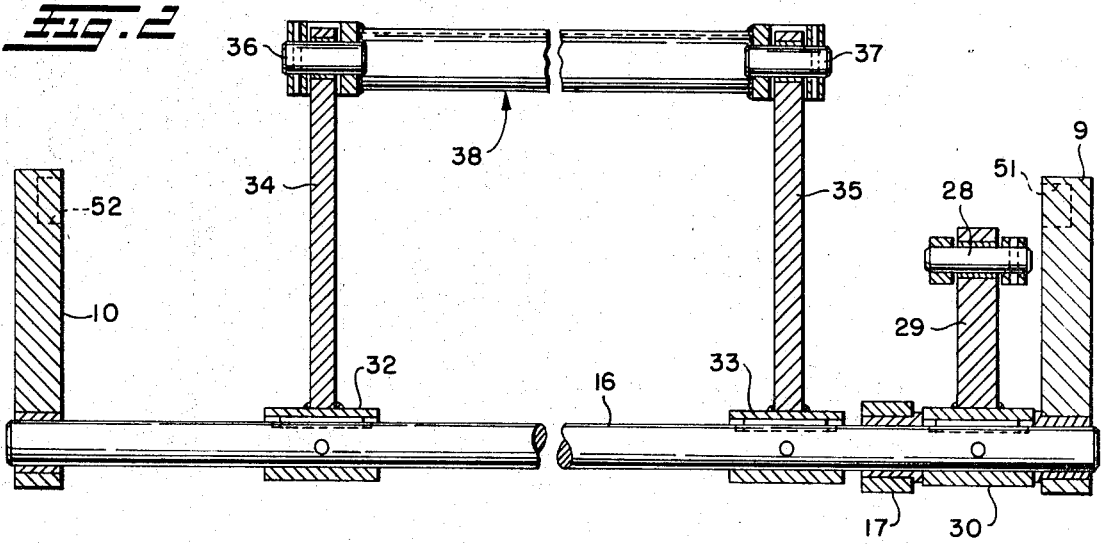
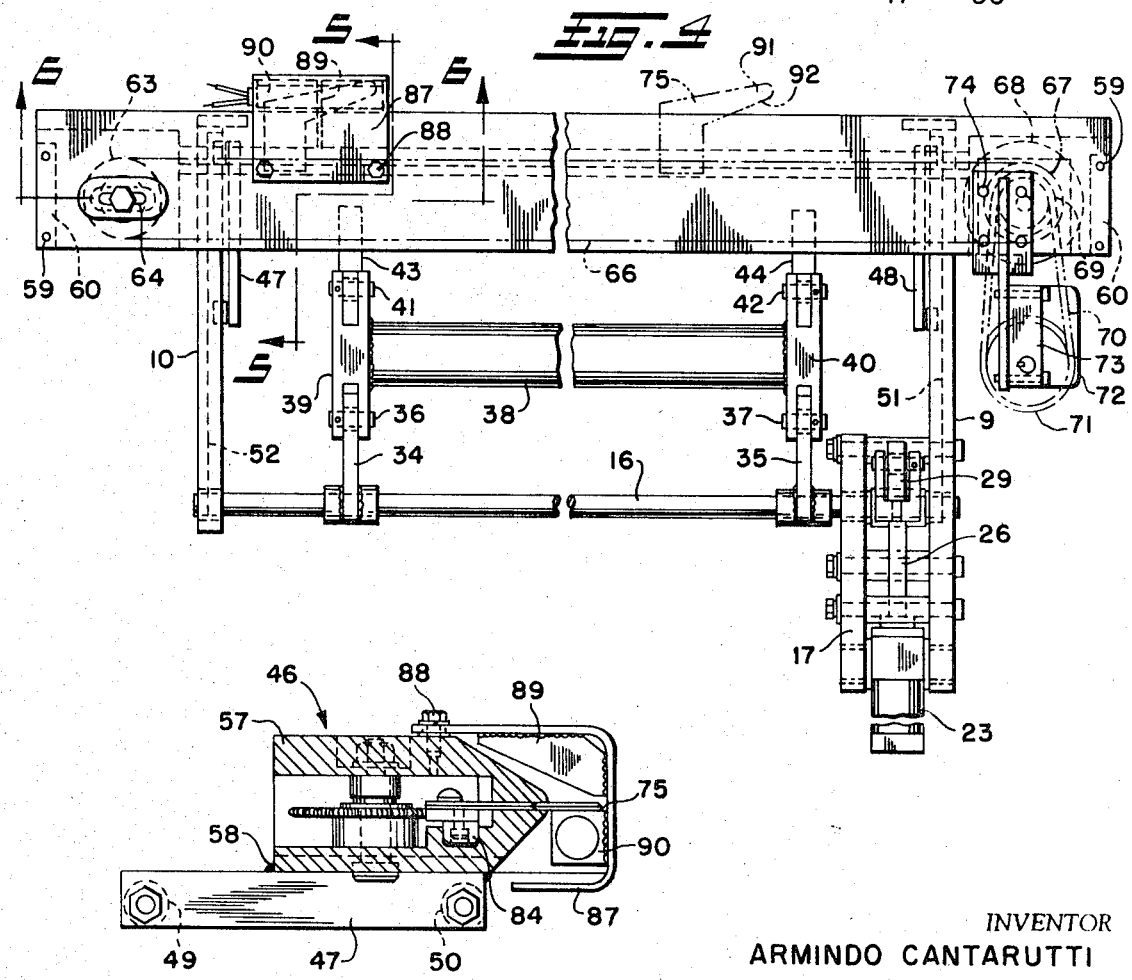
INVENTOR
ARMINDO CANTARUTTI
BY Oberlin, Maky, Donnelly & Renner
ATTORNEYS

TIRE MATERIAL CUTTING APPARATUS

This invention relates generally as indicated to tire material cutting apparatus and more particularly to apparatus for preparing tire stock for automatic application to a tire building machine. The present invention finds particular utility for use in conjunction with the apparatus as illustrated in applicant's copending application, Ser. No. 588,507, filed Oct. 21, 1966, entitled "Apparatus for Severing Tire Ply Stock and the Like," now U.S. Pat. No. 3,429,490.

Tire stock materials, such as the inner liner, side wall material, tread stock, etc., are generally stored separately and fed separately to drum-type tire building machines. The machine operator generally has to wrap the stock material on the drum and then sever the same at the proper position manually rewinding the excess material back onto storage rolls. It would be highly desirable if liner or other tire material stock could be fed to the drum-type tire building machine from the same source or servicer as the tire ply stock and cut to proper length to be applied automatically to the tire building drum.

It is accordingly a principal object of the present invention to provide tire building apparatus which will sever tire stock such as liner material to the required length so that it can be applied automatically to the drum-type tire building machine by the same mechanism applying the tire ply stock.

Another object is the provision of tire stock severing apparatus which will quickly and accurately prepare stock such as a liner for application to a tire building machine.

A further object is the provision of stock severing apparatus which can be used in conjunction with the tire ply stock severing apparatus illustrated in the aforementioned copending application to enable the substantially automatic application of tire materials to the tire building machine.

Yet another object is the provision of an automatic liner and like material severing device which can be indexed into and from operative position when required.

Other objects and advantages of the present invention will become apparent as the following description proceeds.

In said annexed drawings:

FIG. 1 is a fragmentary side elevation, partially in section, illustrating the severing apparatus of the present invention positioned between a servicer and a cut-to-length conveyor table;

FIG. 2 is a fragmentary vertical section taken substantially on the line 2–2 of FIG. 1;

FIG. 3 is a fragmentary vertical section taken substantially on the line 3–3 of FIG. 1;

FIG. 4 is a fragmentary top plan view of the severing apparatus on a somewhat reduced scale and partially broken away;

FIG. 5 is a fragmentary vertical section taken substantially on the line 5–5 of FIG. 4; and FIG. 6 is a fragmentary vertical section taken substantially along the line 6–6 of FIG. 4.

Referring now to the drawings and more particularly to FIG. 1, the apparatus of the present invention is illustrated as installed on the entry end of multiple belt conveyor 1 directly beneath servicer 2. The servicer 2 may, for example, be of the type disclosed in Mallory et al. U.S. Pat. No. 3,216,879 or 3,230,132 while the conveyor 1 may correspond to the conveyor shown in applicant's aforementioned copending application and which may incorporate a ply stock severing device. Accordingly, either ply stock, liner, or like materials may be payed from the servicer onto the conveyor 1 for proper severing and then application to the drum of a tire building machine, not shown.

The conveyor 1 may comprise a plurality of side-by-side belts 3 trained about pulleys 4 at each end driven in synchronism with the servicer liner 5 as well as the drum of the tire building machine. The servicer liner 5 is not to be confused with liner stock 6 of a rubber material used in the construction of a tire. The liner stock may be wrapped between contiguous layers of the servicer liner 5 on storage rolls within the servicer to be payed as desired or programmed onto the conveyor 4 to be severed into appropriate lengths by the severing mechanism shown generally at 8. The severing mechanism 8 is mounted on side plates 9 and 10 which are secured to the frame of the conveyor 1 by suitable fasteners indicated at 11. The side plates thus straddle the conveyor belts 3 and extend back over the journals 12 of the conveyor pulley 4, the latter being mounted for longitudinal adjustment by means of the screw 13 extending through the nuts 14 positioned on either side of the projection 15 of the conveyor frame.

At the lower edge of the L-shape side plates beyond the end of the conveyor 1 there is journaled between such side plates a pivot shaft 16. The pivot shaft is also journaled through an inside plate 17 which is also of a somewhat L-shape and which is held to the side plate 9 by three elongated fasteners 18, 19 and 20, each of which passes through spacing collars or sleeves 21. (See FIG. 3.)

A piston-cylinder assembly 23 is provided with laterally projecting trunnions 24 and 25 which are journaled in the side plate 9 and the inside plate 17, respectively. The rod 26 of the piston-cylinder assembly is connected to clevis 27 which is in turn connected to pin 28 journaled in the outer end of arm 29. The arm 29 is secured to hub 30 in turn secured to pivot shaft 16. The hub 30 is interposed between the flanged bearings supporting the pivot shaft in the side plate and inside plates, respectively.

Also secured to the pivot shaft 16 are hubs 32 and 33 supporting arms 34 and 35, respectively. The upper ends of the arms 34 and 35 are connected by pins 36 and 37 to the rear of a link bar assembly 38. Such assembly comprises end members 39 and 40 which have oppositely directed clevises thereon with a rectangular tubular structural member welded therebetween. The clevises on the forward ends of the end members 39 and 40 are connected by pins 41 and 42 to L-shape brackets 43 and 44 which are secured to the underside of knife housing 46.

Also secured to the underside of the knife housing 46 are roller support bars 47 and 48, each of which have outwardly directed rollers secured thereto at each end as indicated at 49 and 50. Each pair of rollers 49 and 50 ride in inwardly directed slots 51 and 52 in the side plates 9 and 10. Accordingly, the knife housing 46 is mounted for linear reciprocatory movement at the direction of the piston-cylinder assembly 23 from the full line position to the phantom line position indicated at 54 in FIG. 1. Extension of the assembly 23 will pivot the arms 34 and 35 mounted on the pivot shaft 16 moving the knife housing 46 forward from the full line to the phantom line position with the rollers riding in the slots 51 and 52. It is noted that the extent of movement of the housing is substantially greater than the extent of movement of the rod of the piston-cylinder assembly due to the increased length of the arms 34 and 35 as compared to the arm 29. The forward position of the knife housing may be precisely determined by adjusting screws 55 extending through brackets 56 mounted on the ends of the side plates 9 and 10. The ends of the screw may engage the roller support bars 47 and 48 in the extended or phantom line position of the knife housing.

As seen in FIGS. 1, 4, 5 and 6, the knife housing 46 comprises top and bottom members 57 and 58 which are held together at each end by fasteners 59 passing through spacer blocks 60. At one end, a shoulder screw 62 extends between the top and bottom members of the knife housing and a chain sprocket 63 is journaled thereon. The shoulder screw extends through slot 64 and clamping nut 65 is employed adjustably to position the shoulder screw to obtain the desired chain tension. Sprocket chain 66 extends about the idler sprocket 63 and also about drive sprocket 67 mounted on the drive shaft of motor 68 secured to the underside of the knife housing. The drive shaft of the motor 68 also supports another smaller sprocket 69 on top of the sprocket 67 and a chain 70 is trained about the smaller sprocket 69 and a sprocket 71 driving rotary limit switch 72. The latter is mounted on bracket 73 secured by fastener 74 to the top of the knife housing 46.

The knife 75 is secured by suitable fasteners 76 to knife bar 77 which forms an elongated link in the chain 66. The knife projects outwardly of the housing 46 through the narrow slit 78 at the leading edge of the housing formed by the inturned elongated projections 79 and 80 at the front of the housing, both of which are cooperatively rounded as indicated at 81 to provide a smooth projecting die slot along which the knife blade 75 passes. The lower or bottom knife housing member 57 is provided with a channel 82 which receives knife guide 84 which may be a block of wear resistant material secured to the knife bar 77 by fasteners 85. As indicated, shims may be provided between the guide block and the knife bar to support the latter properly for sliding movement within the knife housing. Additional slide blocks, such as indicated at 86 may be provided secured to the chain 66 supporting the latter in its proper horizontal position between the end sprockets. The slide block 84 may more closely fit the channel 82 and serves as a knife guide as the knife is reciprocated during and after its cutting stroke.

As seen in FIGS. 4 and 5, a heater bracket 87 is secured to the upper knife housing member 57 by suitable fasteners 88. The heater bracket is generally U-shape as indicated and extends beyond the forward edge of the knife housing to enclose the blade 75 in its retracted or inoperative position. The bracket 87 is generally U-shape and provided with a reinforcing gusset 89 on one side of the blade and on the opposite side of the blade immediately adjacent thereto is secured a high temperature cartridge heater 90 which may have a 740 watt rating. Thus the blade 75 in its retracted position will be heated quite hot so that it will more readily sever the liner or like rubber tire stock material when energized.

As seen more clearly in FIG. 4, the knife blade 75 is in the form of a boot, the toe 91 of which projects at a substantial angle from the edge of the die slot 78. The underside or cutting portion 92 of the blade extends at an angle of approximately 22° to the die slot so that as the blade moves to the right as seen in FIG. 4, the material will be pinched and severed by the movement of the blade, the temperature of the blade enhancing the severing action.

In operation, with the servicer 2 indexed to supply ply stock to be severed and prepared by a mechanism on the conveyor table 1, not shown, the severing mechanism 8 will be in its retracted position or full line position shown in FIG. 1 clear of the material moving from the servicer to the conveyor 1 which may be indicated at 94. When it is programmed in the automatic cycle of operation of the tire building machine to prepare liner stock or like rubberized rubber stock to be placed on the drum machine, the servicer 2 will be indexed further to place the storage unit containing the desired stock in dispensing position and with the liner 5 of the particular storage unit and the conveyor 1 being driven in synchronism, the liner stock will be payed onto the conveyor 1. The ply severing apparatus on the conveyor will be rendered inoperative and the liner stock will be lineally transported along the top of the conveyor 1 until its leading end reaches a predetermined point. The means for sensing the length of the liner or like stock on the conveyor 1 may comprise a digital counter as illustrated in applicant's aforementioned copending application. When the appropriate length signal is received, the servicer and conveyor 1 will be stopped and the severing mechanism will then be indexed into cutting position by extension of the piston-cylinder assembly 23. At this point, the blade 75 is retracted and within the heater bracket 87 adjacent the heating element 90. The die slot 78 of the knife housing 46 then moves forward to the phantom line position engaging the liner stock, which will normally follow the path indicated at 94, moving it approximately to the position shown at 95 in phantom lines. The stock is now properly engaged by or draped over the die slot of the knife housing and the cutting portion of the cycle is ready to commence. The cutting cycle may commence as soon as the knife housing is in its full forward or operative position. The cutting cycle is commenced by energization of the motor 68 rotating the drive sprocket 67 to move the chain in a clockwise direction as seen in FIG. 4 to move the blade 75 to the right across the stock draped over the die slot. As soon as the blade 75 moves completely transversely through the stock, the rotary limit switch 72 will reverse the motor 68 moving the blade 75 now back or to the left as seen in FIG. 4 to its retracted position within the heater bracket 87. The rotary limit switch 72 will deenergize the motor when the knife blade has reached its retracted position. The severing mechanism is now retracted by retraction of the piston-cylinder assembly 23. This, of course, clears the entry end of the conveyor table for the arrival of the next length or type of stock to be received from the servicer. The servicer is retracted and may be indexed to dispense the next stock in the cycle. The conveyor table 1 now continues to be driven to dispense the now properly length prepared stock onto the drum.

I claim:

1. A cutoff for tire materials comprising a knife blade, a knife housing, an elongated die slot in said housing with said blade projecting therethrough, means operative to move said blade within said housing along said slot with said blade and die slot cooperating to sever tire material situated against said slot, and means operative reciprocably to shift said housing from an inoperative position clear of the material to an operative position wherein such material will be properly situated against said slot and vice versa.

2. A cutoff as set forth in claim 1 wherein said knife blade projects from said die slot at an angle of approximately 22° in the direction of movement of the blade during the severing stroke thereof.

3. A cutoff se set forth in claim 1 wherein said die slot is provided in a narrow somewhat pointed portion of said housing projecting forwardly to ensure proper contact between the slot and the tire material.

4. A cutoff as set forth in claim 1 including blade guide means within said housing operative to maintain the blade in proper cutting position as it moves along said slot.

5. Tire building apparatus comprising a servicer for storing and dispensing lengths of tire material, a cutoff conveyor table positioned to receive such material from said servicer for preparing predetermined lengths of such material for application to a tire building machine, a cutoff at the entry end of said table operative to sever a predetermined length of such material, means operative to shift said cutoff from an inoperative position clear of such material passing from said servicer to said table to a position in engagement with such material to sever a predetermined length thereof, said means operative to shift said cutoff comprising a piston-cylinder assembly, and pivot shaft and arm means interconnecting said piston-cylinder assembly and said cutoff.

6. Tire building apparatus comprising a servicer for storing and dispensing lengths of tire material, a cutoff conveyor table positioned to receive such material from said servicer for preparing predetermined lengths of such material for application to a tire building machine, a cutoff at the entry end of said table operative to sever a predetermined length of such material, and means operative to shift said cutoff from an inoperative position clear of such material passing from said servicer to said table to a position in engagement with such material to sever a predetermined length thereof, said cutoff comprising a knife housing having an elongated die slot therein which in the operative position of said cutoff will be pressed against such material.

7. Apparatus as set forth in claim 6 including a knife projecting from said housing and movable along said die slot operative to sever such material thereagainst.

8. Apparatus as set forth in claim 7 including drive means for said knife operative to move the same along said slot comprising a chain connected to said knife, and guide means for said chain within said housing operative to control the position of said knife as it is thus moved along said die slot.

9. Apparatus as set forth in claim 8 wherein said knife includes an angular cutting edge extending approximately 22° from said die slot in the direction of movement of said knife during the cutting stroke thereof.

10. Apparatus as set forth in claim 8 wherein said drive means comprises a reversible motor, limit switch means driven by said reversible motor operative to reverse the same upon completion of the cutting stroke.

11. Apparatus as set forth in claim 10 including a heating element for said knife operative to maintain the same heated to facilitate the severing of such material.

12. A cutoff for tire materials comprising a knife blade, a knife housing, an elongated die slot in said housing with said blade projecting therethrough, means operative to move said blade within said housing along said slot to sever tire material situated against said slot, said blade being secured to a drive chain within said housing, and a drive motor operative to move said chain and thus said blade.

13. A cutoff for tire materials comprising a knife blade, a knife housing, an elongated die slot in said housing with said blade projecting therethrough, means operative to move said blade within said housing along said slot to sever tire material situated against said slot, a knife enclosure projecting from said housing at one end thereof, and a heating element juxtaposed to said knife blade when the latter is within said enclosure.

14. A cutoff for tire materials comprising a knife blade, a knife housing, an elongated die slot in said housing with said blade projecting therethrough, means operative to move said blade within said housing along said slot to sever tire material situated against said slot, a conveyor table operative to receive such tire material being severed, and means mounting said housing for reciprocatory movement above and parallel to said table at the entry end thereof.

15. Tire building apparatus comprising a servicer for storing and dispensing lengths of tire material, a cutoff conveyor table positioned to receive such material from said servicer for preparing predetermined lengths of such material for application to a tire building machine, a cutoff at the entry end of said table operative to sever a predetermined length os such material, means operative to shift said cutoff from an inoperative position clear of such material passing from said servicer to said table to a position in engagement with such material to sever a predetermined length thereof, said cutoff comprising a knife housing having an elongated die slot therein which in the operative position of said cutoff will be pressed against such material, a knife projecting from said housing and movable along said die slot operative to sever such material thereagainst, drive means for said knife operative to move the same along said slot comprising a chain connected to said knife, guide means for said chain within said housing operative to control the position of said knife as it is thus moved along said slot, said drive means comprising a reversible motor, limit switch means driven by said reversible motor operative to reverse the same upon completion of the cutting stroke, and a heating element for said knife operative to maintain the same heated to facilitate the severing of such material, said heating element being mounted in an enclosure for said knife at one side of such material.

16. A cutoff for tire materials comprising a knife blade, a knife housing, an elongated die slot in said housing with said blade projecting therethrough, means operative to move said blade within said housing along said slot with said blade and die slot cooperating to sever tire material situated against said slot, means operative reciprocably to shift said housing from an inoperative position clear of the material to an operative position wherein such material will be properly situated against said slot and vice versa, a drive motor for said blade, and a rotary limit switch driven by said motor operative to reverse said motor upon completion of the cutting stroke of the blade.

17. A cutoff for tire materials comprising a knife blade, a knife housing, an elongated die slot in said housing with said blade projecting therethrough, means operative to move said blade within said housing along said slot with said blade and die slot cooperating to sever tire material situated against said slot, means operative reciprocably to shift said housing from an inoperative position clear of the material to an operative position wherein such material will be properly situated against said slot and vice versa, said means operative to shift said housing comprising a piston-cylinder assembly, and pivot shaft link means interconnecting said piston-cylinder assembly and said housing.

18. A cutoff for tire materials comprising a knife blade, a knife housing, an elongated die slot in said housing with said blade projecting therethrough, means operative to move said blade within said housing along said slot with said blade and die slot cooperating to sever tire material situated against said slot, means operative reciprocably to shift said housing from an inoperative position clear of the material to an operative position wherein such material will be properly situated against said slot and vice versa, said means operative to shift said housing comprising a piston-cylinder assembly, a pivot shaft, and arms secured to said pivot shaft and to said piston-cylinder assembly and knife housing, respectively, the arm connected to said housing being substantially longer than the arm connected to said piston-cylinder assembly.

19. Tire building apparatus comprising a servicer for storing and dispensing lengths of tire material, a cutoff conveyor table positioned to receive such material from said servicer for preparing predetermined lengths of such material for application to a tire building machine, a cutoff at the entry end of said table operative to sever a predetermined length of such material, means operative to shift said cutoff from an inoperative position clear of such material passing from said servicer to said table to a position in engagement with such material to sever a predetermined length thereof; said means operative to shift said cutoff comprising a piston-cylinder assembly, pivot shaft link means interconnecting said piston-cylinder assembly and said cutoff, said pivot shaft link means comprising a pivot shaft, arm means extending from said pivot shaft to said cutoff, and second arm means extending from said pivot shaft to said piston-cylinder assembly, said second arm means being substantially shorter than the arm means extending from said pivot shaft to said cutoff.

PO-1050
(5/69)

UNITED STATES PATENT OFFICE
CERTIFICATE OF CORRECTION

Patent No. 3,557,650          Dated January 26, 1971

Inventor(s) Armindo Cantarutti

It is certified that error appears in the above-identified patent and that said Letters Patent are hereby corrected as shown below:

The assignee AMK Subsidiary Corp. should be changed to --NRM Corporation--.

Signed and sealed this 24th day of August 1971.

(SEAL)
Attest:

EDWARD M. FLETCHER, JR.        WILLIAM E. SCHUYLER, JR.
Attesting Officer              Commissioner of Patents